(12) United States Patent
Fu

(10) Patent No.: US 7,581,187 B2
(45) Date of Patent: Aug. 25, 2009

(54) REUSEABLE HIGH LEVEL GRAPHICAL USER INTERFACE TEMPLATE

(75) Inventor: Jennifer Jie Fu, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 667 days.

(21) Appl. No.: 10/636,082

(22) Filed: Aug. 7, 2003

(65) Prior Publication Data
US 2005/0034061 A1 Feb. 10, 2005

(51) Int. Cl.
G06F 15/177 (2006.01)
G06F 3/048 (2006.01)

(52) U.S. Cl. .................. 715/734; 715/736; 715/826

(58) Field of Classification Search ......... 715/734–736, 715/737, 255, 826, 829, 841; 707/102, 103 R; 709/202
See application file for complete search history.

(56) References Cited

U.S. PATENT DOCUMENTS 6,279,008 B1 * 8/2001 Tung Ng et al. ............ 707/102
6,407,751 B1 * 6/2002 Minami et al. ............. 715/736

* cited by examiner

Primary Examiner—Weilun Lo
Assistant Examiner—Truc T Chuong

(57) ABSTRACT

An article of manufacture comprising a program storage medium having computer readable code embodied therein is disclosed. The computer readable code is configured to implement a graphical user interface (GUI) template. The GUI template is configured to create one of a plurality of graphical user interfaces (GUIs). The programmable storage medium includes computer readable code for rendering a plurality of GUI components. There is further included computer readable code for implementing a plurality of functions, each of the plurality of functions being associated with one of the plurality of GUI components. One of the plurality of functions is invoked when a respective one of the plurality of GUI components is activated by a user via the one of the plurality of GUIs. There is additionally included computer readable code for implementing a calling mechanism, the calling mechanism permitting a user to specify a subset of the plurality of GUI components to be rendered in the one of the plurality of GUIs.

18 Claims, 4 Drawing Sheets

Rhl-Table (string Title, table TableContentSource, int ButtonPosition, vector Button)

Fig. 3

Rhl-Table ("Employee Table", {{("Employee ID", "Name", "Phone Number"} {"345678", "John Beamer", "408-123-4567"} {"345679", "Michael Miller", "408-123-4242"}}, 1, {"Add", "Delete", "Update", "Reset"})

Fig. 4.

Employee Table

| Employee ID | Name | Phone Number |
|---|---|---|
| 345678 | John Beamer | (408)123-4567 |
| 345679 | Micheal Miller | (408)123-4242 |

Add  Delete  Update  Reset

Fig. 5

REUSEABLE HIGH LEVEL GRAPHICAL USER INTERFACE TEMPLATE

BACKGROUND OF THE INVENTION

Graphical User Interfaces (GUIs) have long been employed to facilitate user data input and/or to display output data. By way of example, tables have long been employed to display data in the form of rows and columns, as well as to allow the user to input data into the rows and columns of the table. Charts, graphs, pop-up dialogs, and the like are other examples of GUIs that have been employed.

The process of creating a GUI for a particular task has long been the province of programmers. Programmers typically assess the task to be performed, in terms of the required inputs and outputs, and create a GUI to accomplish that specific task. On a large software project, however, there may be a large number of GUIs that are similar (but may not be exactly identical) for handling certain types of input/output tasks. For example, a manufacturer may employ a table to enter/display data pertaining to employees, another table to enter/display data pertaining to sales information, and yet another table to enter/display data pertaining to inventory. Although a table is involved in each of these examples, the labels, the number of rows and columns, the functions (and the buttons for allowing the user to access those functions), and the data types of the cells therein may differ.

Currently, each GUI would be created by programmers from low-level graphical components, such as those provided with Java Swing™ (JS), which is part of the Java Foundation Class (JFC) by Sun Microsystems, Inc. of Mountain View, Calif. FIG. 1 is a flow chart showing exemplary prior art steps that may be taken by a Java Swing programmer to create one of the table GUIs described earlier, e.g., the table GUI for entering/displaying data pertaining to employees. In step 102, the JS low-level graphical components necessary to implement the employee table are invoked. In this case, it may be a table with 7 columns, for example, to capture the seven attributes associated with each employee.

In step 104, the JS low-level graphical component for creating the table title is invoke (e.g., to label the table "Employee of ABC Manufacturing Company"). In step 106, the JS low-level graphical components for creating the buttons to allow the user to access the desired functions are invoked. The desired functions may be, for example, add an employee, delete an employee, search for an employee, and the like.

In step 108, the functions themselves are coded. In other words, the function of adding an employee is actually coded in step 108. This function may involve, for example, inserting a new row into the table, and allowing the computer operator to fill out the various cells in the new row regarding the new employee.

In step 110, the JS low-level graphical components are integrated, e.g., to enable the "add employee" function to be invoked when the "add employee" button is clicked. In step 112, the employee table GUI is tested. Once testing/debugging is completed, the table GUI may be accepted for use in the product (step 114).

Although GUIs can be created from low-level graphical components, such as JS components, there are disadvantages. For example, a given product may involve hundreds or thousands of GUIs. If every GUI must be created from scratch from low-level graphical components, a significant amount of time is required to complete the GUI portion of the product alone. Furthermore, since each GUI involves the coding of the functions and the integration of low-level components and functions, a significant level of skill is required to create, test, and deploy a GUI. This high level of skill limits the number of people that can be assigned to the GUI creation task, as well as raising the cost of product development.

Additionally, given the large number of GUIs involved in a given product, there may be dozens of programmers working on GUIs. These programmers may have different preferences as to the "look and feel" of the GUIs. Accordingly, an "items sold" table GUI may have an entirely different "look and feel" from an inventory table GUT although they both pertain to items stocked by the company. The lack of uniformity in the look-and-feel among different GUIs in a single product may disadvantageously lower the level of user-friendliness of the product and/or give the final product a less-than-polished appearance.

SUMMARY OF INVENTION

The invention relates, in one embodiment, to an article of manufacture comprising a program storage medium having computer readable code embodied therein. The computer readable code is configured to implement a graphical user interface (GUI) template. The GUI template is configured to create one of a plurality of graphical user interfaces (GUIs). The programmable storage medium includes computer readable code for rendering a plurality of GUI components. There is further included computer readable code for implementing a plurality of functions, each of the plurality of functions being associated with one of the plurality of GUI components. One of the plurality of functions is invoked when a respective one of the plurality of GUI components is activated by a user via the one of the plurality of GUIs. There is additionally included computer readable code for implementing a calling mechanism, the calling mechanism permitting a user to specify a subset of the plurality of GUI components to be rendered in the one of the plurality of GUIs.

In another embodiment, the invention relates to a method for creating a re-useable high level graphical user interface (RHL-GUI) template. The method includes ascertaining a plurality of required components for the RHL-GUI template, each of plurality of required components being implemented using furnished features in a GUI creation software. The method further includes ascertaining a default look-and-feel for the RHL-GUI template. The method additionally includes coding a set of functions. Furthermore, there is included associating the set of functions with selective ones of the plurality of required components of the RHL-GUI template, one of the set of functions being invoked when an associated one of the selective ones of the plurality of required components is activated by a user. Additionally, there is included providing a calling mechanism for the RHL-GUI template, the calling mechanism, when invoked, renders the RHL-GUI template having the plurality of required components, implementing the functions, and conforming to the default look-and-feel.

In yet another embodiment, the invention relates to an article of manufacture comprising a program storage medium having computer readable code embodied therein, the computer readable code being configured to implement a graphical user interface (GUI) template, the GUI template being configured to create one of a plurality of graphical user interfaces (GUIs). The article of manufacture includes computer readable code for implementing a calling mechanism and computer readable code for rendering a plurality of GUI components. There is further included computer readable code for implementing a plurality of functions, each of the plurality of functions being associated with one of the plurality of GUI components, one of the plurality of functions being invoked when a respective one of the plurality of GUI components is activated by a user via the one of the plurality of GUIs. At least one of the plurality of functions, when invoked, affects a GUI component other than a GUI component associated with the at least one of the plurality of functions, wherein the calling mechanism permits a user to specify a subset of the plurality of GUI components to be rendered in the one of the plurality of GUIs. The calling mechanism further includes a mechanism for receiving data to be rendered in a given one of the plurality of GUI components.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 shows, in accordance with one embodiment of the present invention, an exemplary calling mechanism employed to render a table GUI via a table RHL-GUI template.

FIG. 4 shows, in accordance with one embodiment of the present invention, a sample RHL-GUI call by a GUI developer.

FIG. 5 illustrates, in accordance with one embodiment of the present invention, the resultant employee table GUI that is rendered by activating the RHL-GUI template of FIG. 4.

DETAILED DESCRIPTION OF PREFERRED EMBODIMENTS

Figure 1:
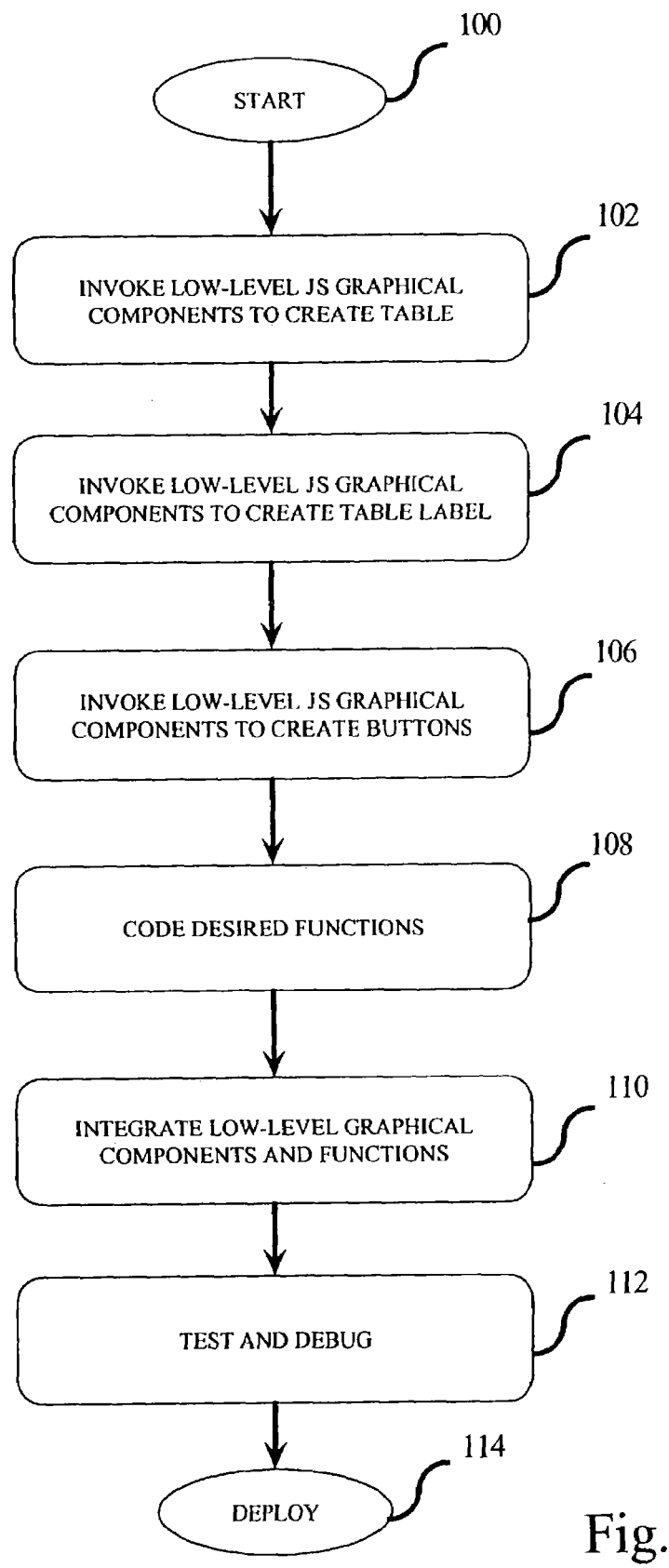
FIG. 1 is a flow chart showing exemplary prior art steps that may be taken by a Java Swing programmer to create a table GUI for entering/displaying data pertaining to employees.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the invention, there is provided a re-useable high level graphical user interface (RHL-GUI) template, which integrates low-level graphical components, functions, and one or more selectable look-and-feel schemes, to enable GUI developers to quickly create GUIs for a given software product. Unlike in the prior art, the GUI developer no longer needs to perform the task of coding the required functions and integrating the functions with the low-level graphical components in order to create the required GUI. Instead, the coding of the functions and the integration of a function with its respective graphical component (e.g., a button) are performed beforehand and embedded as part of the RHL-GUI template.

The RHL-GUI template can then be invoked during development time using a calling mechanism. Once invoked, the RHL-GUI template will render the required graphical components of the required GUI, provide the functions specified via the calling mechanism, and furnishing the uniform look-and-feel. Since the coding of the functions and the integration of the graphical components have been performed and tested in advance, GUIs can be quickly created using the invention without requiring a high level of programming skill. Further, since the GUI that is rendered via the RHL-GUI template can have its look-and-feel enforced, the GUIs across a product can have a consistent look-and-feel, thereby increasing the level of user-friendliness of the product.

Consider the following examples. With respect to the employee/items sold/inventory table GUIs mentioned earlier, the low level components may represent, for example, the grid of the table itself, the table label, the buttons to allow the user to click, etc. Generally speaking, the functions required in a GUI may differ depending on the particular task for which the GUI is tailored. For example, an "items-sold" table GUI may have a function to sum the costs of all the items sold, another function to calculate the tax, etc. In the "Employee Data" table, these functions are inapplicable. Thus, in the prior art, the task of programming the functions are typically left to the GUI developers themselves.

With the RHL-GUI template, however, a set of functions is coded in advanced, tested, and provided to the GUI developer for selection. Furthermore, the RHL-GUI template integrates in advance the functions with graphical components, such as user-selectable or user-clickable graphical components (e.g., buttons, a choice in a pull-down or pop-up list, a location on a graphical feature, etc.). Additionally, the order in which the low-level graphical components, such as the table grid, the label, the buttons, are arranged within the GUI border is preferably pre-defined based on a default look-and-feel or on a limited set of selectable look-and-feel schemes. Accordingly, the resultant GUIs across a product tend to have a similar look-and-feel, which is advantageous from a user-friendliness perspective.

Figure 2:
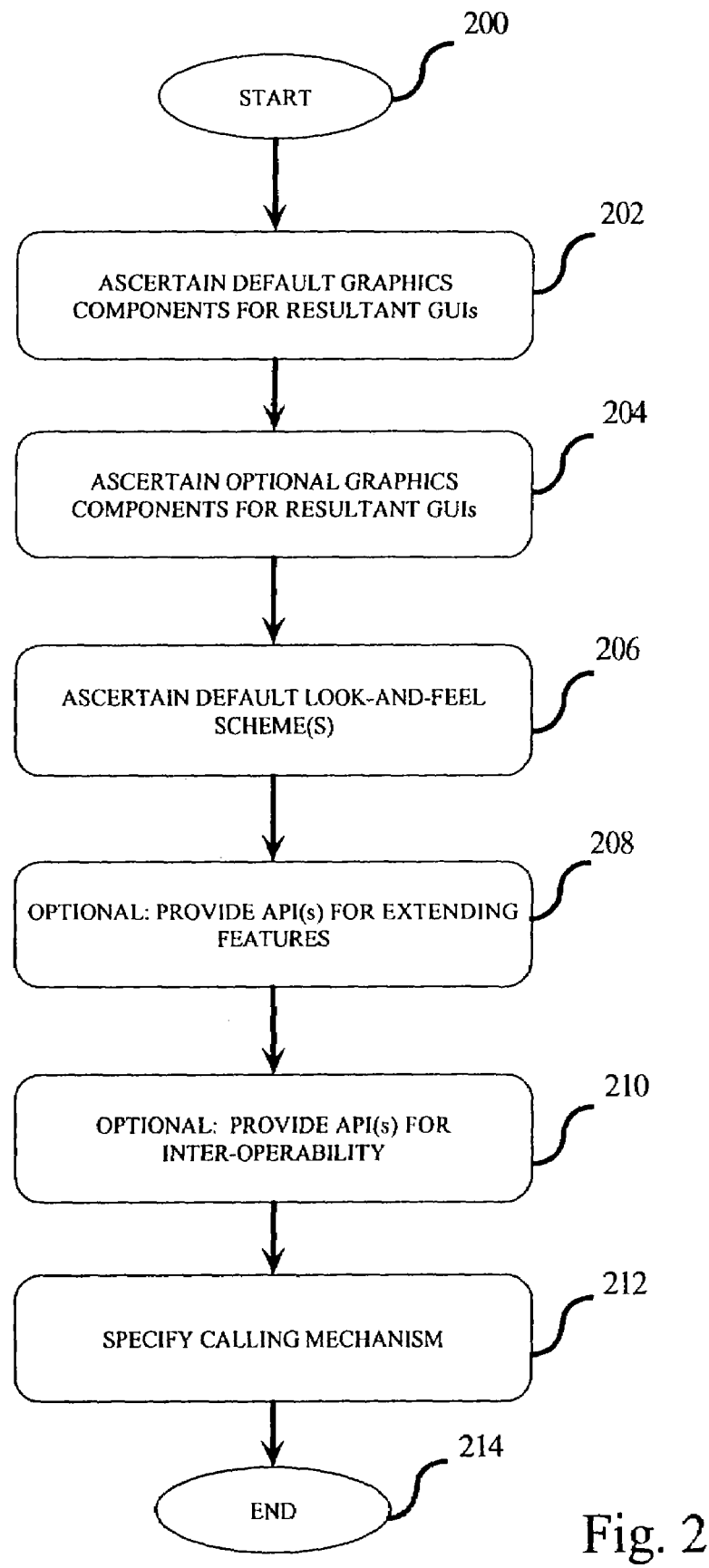
FIG. 2 shows, in accordance with one embodiment of the present invention, the steps involved in creating a RHL-GUI template from low level graphical components.

The features and advantages of the invention may be better understood with reference to the figures and discussions that follow. FIG. 2 shows, in accordance with one embodiment of the present invention, the steps involved in creating a RHL-GUI template from low level graphical components. As an example to facilitate understanding of FIG. 2, assume that the low-level graphical components are invoked via the aforementioned Java Swing. It should be kept in mind, however, that the invention is not limited to any particular low-level graphical tool.

In step 202, the default graphical components for the RHL-GUI template are ascertained. This set of default graphical components represent the graphical components needed across different GUI tasks for which the resultant GUI is expected to address. With respect to the aforementioned employee/items-sold/inventory table examples, the default graphical components may represent, for example, a table, a table label, and a set of buttons. These graphical components are default since each of the employee/items sold/inventory table GUIs must include at least these default graphical components.

In step 204, the optional graphical components are ascertained. These are the graphical components that may be present in some GUI application but not others. For example, the items-sold table GUI may have a pie-chart graphical component to show the sales performance by each division of the business. Such pie-chart graphical component may not be necessary in, for example, the employee table GUI.

In step 206, the default look-and-feel for the GUIs to be rendered by the RHL-GUI template is ascertained. In one embodiment, there may be multiple look-and-feel schemes to be provided for selection by the GUI developer. Irrespective, there should be a default or a set of acceptable look-and-feel schemes to be enforced across the software product.

In optional step 208, an application programming interface (API) or a set of APIs is provided to facilitate extending the RHL-GUI template features. For example, instead of a standard option, pie-chart as mentioned in step 204, a customized graphical component can be added by the API.

In optional step 210, an application programming interface (API) or a set of APIs is provided to facilitate inter-operability with other components/parts. For the customized component in step 208, any changes in the RHL-GUI will trigger the related changes. For example, if one employee is added, the customized component will reflect the change as well.

In step 212, a calling mechanism is specified to allow the GUI developer to invoke the RHL-GUI template in order to render the desired GUI. The calling mechanism includes at least the RHL-GUI template identifier and a list of parameters for the default and optional graphical components.

FIG. 3 shows, in accordance with one embodiment, an exemplary calling mechanism employed to render a table GUI via a table RHL-GUI template. In the example of FIG. 3, the identifier "RHL-TABLE" identifies the RHL-GUI template to be invoked. The parameter "Title" having a type String specifies the title for the table. The parameter Table-ContentSource having a type Table identifies the table content to be rendered.

The parameter ButtonPosition having a type integer identifies the location of the buttons. In this example, the integer value 1 may represent the location below the table, the integer value 2 may represent the location above the table, the integer value 3 may represent the location to the left of the table, the integer value 4 may represent the location to the right of the table.

The parameter Button having a type vector represents the button graphical components. As mentioned earlier, these buttons are integrated with their associated functions in advance in the RHL-GUI template. By selecting the desired Button parameters from a library of Buttons, the GUI developer may quickly create user-activable functions in the GUI in the form of clickable buttons, for example.

FIG. 4 shows, in accordance with one embodiment of the present invention, a sample RHL-GUI call by a GUI developer. By specifying the RHL-GUI template name RHL-TABLE, the RHL-GUI template for creating tables is invoked. The title is specified ("Employee Table", along with the table content, such as the column titles (Employee ID, Name, Phone Number) and the content for two rows of the table. In another embodiment, the table content may be furnished by specifying a file name or an API to another data source. An integer ("1") specifies that the Buttons be located below the table, and four buttons implementing the "Add", "Delete", "Update", and "Reset" functions are specified.

If a different table GUI is desired, the list of parameters furnished by the GUI developer may differ from that shown in FIG. 4 and may include optional parameters. For example, a different list of parameters may be specified with the RHL-GUI template of FIG. 3 to create a sales information table GUI.

FIG. 5 illustrates, in accordance with one embodiment of the present invention, the resultant employee table GUI that is rendered by activating the RHL-GUI template in the manner discussed in FIG. 4.

As can be appreciated from the foregoing, the RHL-GUI template of the present invention allows the GUI developer to quickly create GUIs for a product. Advantageously, the GUI developer no longer has to program the functions, integrate the functions with the low-level graphical components (e.g., buttons), and test the resultant GUIs. Since the functions are created, tested, and integrated with their respective low-level graphical components in advance, a GUI can be created by simply invoking the appropriate RHL-GUI template and the appropriate set of parameters.

While this invention has been described in terms of several preferred embodiments, there are alterations, permutations, and equivalents which fall within the scope of this invention. For example, although the invention refers to a table GUI for illustration purposes, the re-useable high level GUI template of the present invention may also apply to other GUIs (e.g., charts, graphs, dialog boxes, input forms, etc.) It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An article of manufacture comprising a program storage medium having computer readable code embodied therein, said computer readable code being configured to implement a graphical user interface (GUI) template, said GUI template being configured to create one of a plurality of graphical user interfaces (GUIs), comprising:

computer readable code for rendering a plurality of GUI components; computer readable code for implementing a plurality of functions, each of said plurality of functions being associated with one of said plurality of GUI components, one of said plurality of functions being invoked when a respective one of said plurality of GUI components is activated by a user via said one of said plurality of GUIs, wherein said plurality of functions are created, tested, and integrated with said plurality of GUI components in advance of said one of said plurality of functions being invoked;

computer readable code for implementing a calling mechanism, said calling mechanism permitting a user to specify a subset of said plurality of GUI components to be rendered in said one of said plurality of GUIs; and computer readable code for creating a re-useable high level graphical user interface (RHL-GUI) template comprising:

ascertaining a plurality of optional components for said RHL-GUI template, each of said plurality of said optional components being implemented using said furnished features in said existing GUI creation software; and providing optional calling parameters for said calling mechanism, said optional calling parameters, when invoked in conjunction with said calling mechanism, renders at least a subset of said plurality of optional components as part of said RHL-GUI template.

2. The article of manufacture of claim 1 wherein at least two of said plurality of said GUIs have different sets of GUI components, each of said sets of GUI components being a subset of said plurality of GUI components.

3. The article of manufacture of claim 1 wherein said plurality of GUI components comprise a required subset and an optional subset, said required subset representing GUI components to be rendered in each of said plurality of GUIs, said optional subset representing GUI components rendered only when specified by said user through said calling mechanism.

4. The article of manufacture of claim 3 further comprising computer readable code implementing a visual scheme for said one of said plurality of (GUIs).

5. The article of manufacture of claim 3 further comprising computer readable code implementing plurality of user-selectable visual schemes for said one of said plurality of (GUIs), said plurality of user-selectable visual schemes being selectable through said calling mechanism.

6. The article of manufacture of claim 5 wherein said plurality of user-selectable visual schemes include locations for at least one of said plurality of GUI components.

7. The article of manufacture of claim 1 further comprising computer readable code for implementing an application programming interface (API) to facilitate extending said one of said plurality of GUIs.

8. The article of manufacture of claim 1 further comprising computer readable code for implementing an application programming interface (API) to facilitate inter-operability.

9. The article of manufacture of claim 1 wherein said calling mechanism further includes a mechanism for receiving data to be rendered in a given one of said plurality of said GUI components.

10. The article of manufacture of claim 9 wherein said given one of said plurality of GUI components is one of a table, a graph, and a chart.

11. A method for creating a re-useable high level graphical user interface (RHL-GUI) template, comprising:
    ascertaining a plurality of required components for said RHL-GUI template, each of plurality of required components being implemented using furnished features in a GUI creation software;
    ascertaining a default look-and-feel for said RHL-GUI template;
    coding a set of functions;
    associating said set of functions with selective ones of said plurality of required components of said RHL-GUI template, one of said set of functions being invoked when an associated one of said selective ones of said plurality of required components is activated by a user, wherein said set of functions are created, tested, and integrated with said plurality of required components for said RHL-GUI template in advance of said one of said set of functions being invoked;
    providing a calling mechanism for said RHL-GUI template, said calling mechanism, when invoked, renders said RHL-GUI template having said plurality of required components, implementing said functions, and conforming to said default look-and-feel;
    ascertaining a plurality of optional components for said RHL-GUI template, each of said plurality of said optional components being implemented using said furnished features in said existing GUI creation software; and
    providing optional calling parameters for said calling mechanism, said optional calling parameters, when invoked in conjunction with said calling mechanism, renders at least a subset of said plurality of optional components as part of said RHL-GUI template.

12. The method of claim 11 wherein said GUI creation software is Java Swing™.

13. The method of claim 11 wherein said RHL-GUI template pertains to a table GUI.

14. The method of claim 11 further comprising:
    providing an application programming interface with said RHL-GUI template to facilitate interoperability between said RHL-GUI template and other components external to said RHL-GUI template.

15. An article of manufacture comprising a program storage medium having computer readable code embodied therein, said computer readable code being configured to implement a graphical user interface (GUI) template, said GUI template being configured to create one of a plurality of graphical user interfaces (GUIs), comprising:
    computer readable code for implementing a calling mechanism;
    computer readable code for rendering a plurality of GUI components;
    computer readable code for implementing a plurality of functions, each of said plurality of functions being associated with one of said plurality of GUI components, one of said plurality of functions being invoked when a respective one of said plurality of GUI components is activated by a user via said one of said plurality of GUIs, wherein said plurality of functions are created, tested, and integrated with said plurality of GUI components in advance of said one of said plurality of functions being invoked;
    at least one of said plurality of functions, when invoked, affects a GUI component other than a GUI component associated with said at least one of said plurality of functions, wherein said calling mechanism permits a user to specify a subset of said plurality of GUI components to be rendered in said one of said plurality of GUIs, said calling mechanism further includes a mechanism for receiving data to be rendered in a given one of said plurality of GUI components;
    computer readable code for creating a re-useable high level graphical user interface (RHL-GUI) template comprising:
        ascertaining a plurality of optional components for said RHL-GUI template, each of said plurality of said optional components being implemented using said furnished features in said existing GUI creation software; and
        providing optional calling parameters for said calling mechanism, said optional calling parameters, when invoked in conjunction with said calling mechanism, renders at least a subset of said plurality of optional components as part of said RHL-GUI template.

16. The article of manufacture of claim 15 wherein at least two of said plurality of said GUIs have different sets of GUI components, each of said sets of GUI components being a subset of said plurality of GUI components, said different sets of GUI components being specified through said calling mechanism.

17. The article of manufacture of claim 15 wherein said plurality of GUI components comprise a required subset and an optional subset, said required subset representing GUI components to be rendered in each of said plurality of GUIs, said optional subset representing GUI components rendered only when specified by said user through said calling mechanism.

18. The article of manufacture of claim 15 further comprising computer readable code implementing plurality of user-selectable visual schemes for said one of said plurality of (GUIs), said plurality of user-selectable visual schemes being selectable through said calling mechanism.

* * * * *